United States Patent [19]
Meza

[11] Patent Number: 5,452,706
[45] Date of Patent: Sep. 26, 1995

[54] ROLL-UP BARBECUE APPARATUS

[76] Inventor: Frank Meza, 24 Calle Alamo, Santa Barbara, Calif. 93105

[21] Appl. No.: 331,086
[22] Filed: Oct. 28, 1994
[51] Int. Cl.6 .................................. F24C 1/16
[52] U.S. Cl. ................ 126/30; 126/29; 126/9 B; 126/9 R; 99/449
[58] Field of Search ............... 126/9 R, 9 B, 126/29, 30; 99/449, 450; 211/189, 195

[56] References Cited

U.S. PATENT DOCUMENTS

| | | |
|---|---|---|
| 793,151 | 6/1905 | Palmer ........................ 126/30 X |
| 1,244,357 | 10/1917 | Moore . |
| 1,700,843 | 2/1929 | Hayward ..................... 211/195 X |
| 2,839,043 | 6/1958 | LaBorn . |
| 3,461,634 | 8/1969 | Curtis et al. ................. 126/30 |
| 3,837,328 | 9/1974 | Schaffer ...................... 126/29 |
| 3,975,999 | 8/1976 | Cardol ........................ 126/9 R |
| 4,393,857 | 7/1983 | Saford ........................ 126/9 R |
| 4,977,824 | 12/1990 | Shinler ....................... 99/449 |
| 5,317,961 | 6/1994 | Shiner ........................ 99/449 |

Primary Examiner—Carl D. Price
Attorney, Agent, or Firm—William W. Haefliger

[57] ABSTRACT

Portable barbecue apparatus comprising a series of longitudinally extending, laterally spaced grill rods; and laterally extending, longitudinally spaced cables connected to the rods; the cables being flexible, whereby the rods and cables may be rolled up into a bundle for transport, and unrolled to form a cooking grill.

7 Claims, 3 Drawing Sheets

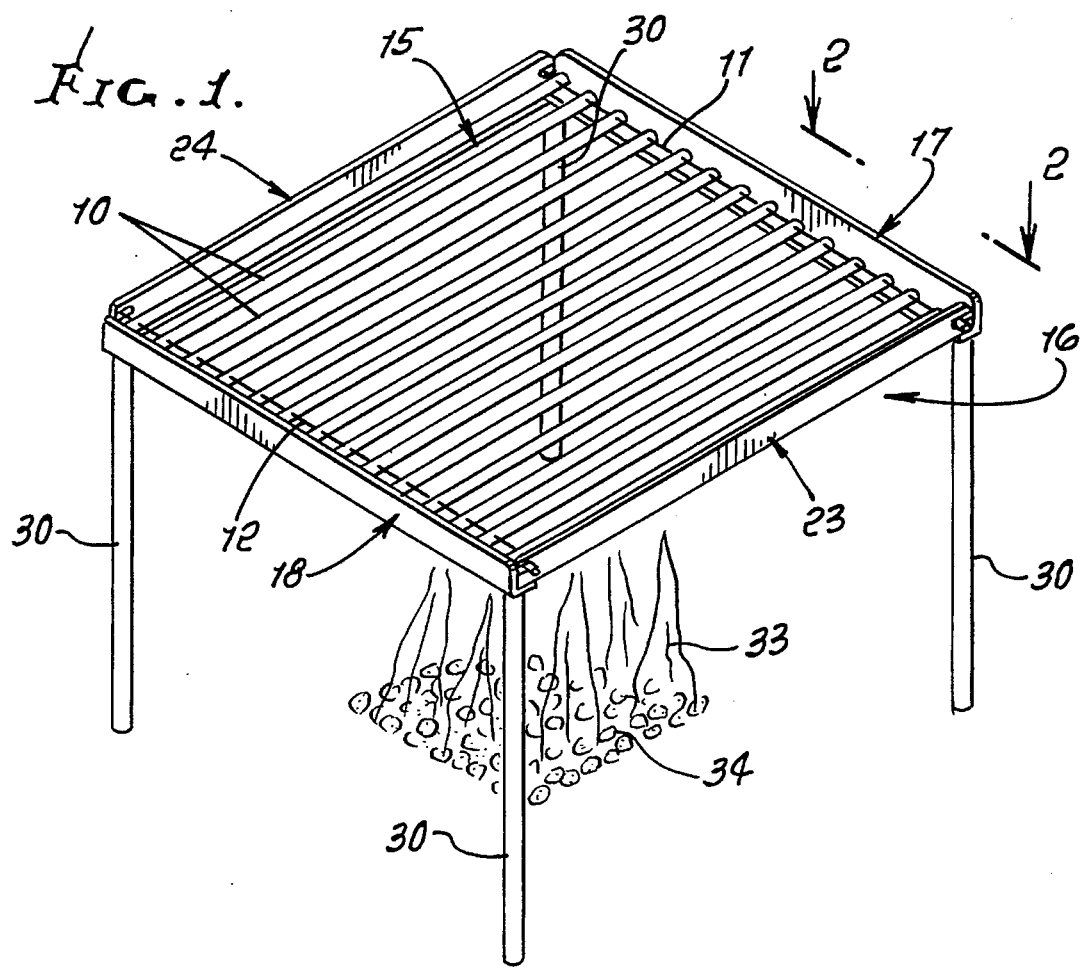
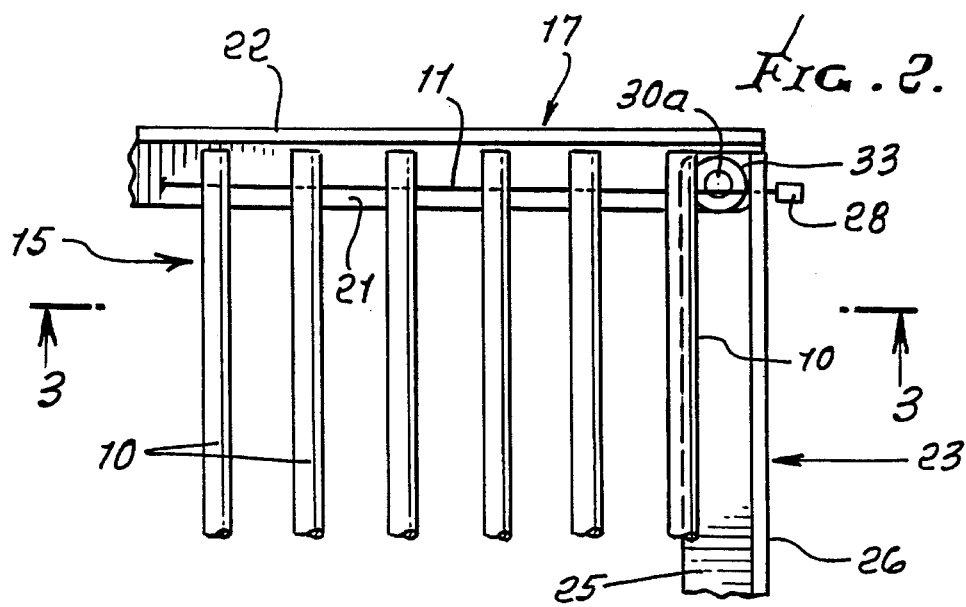

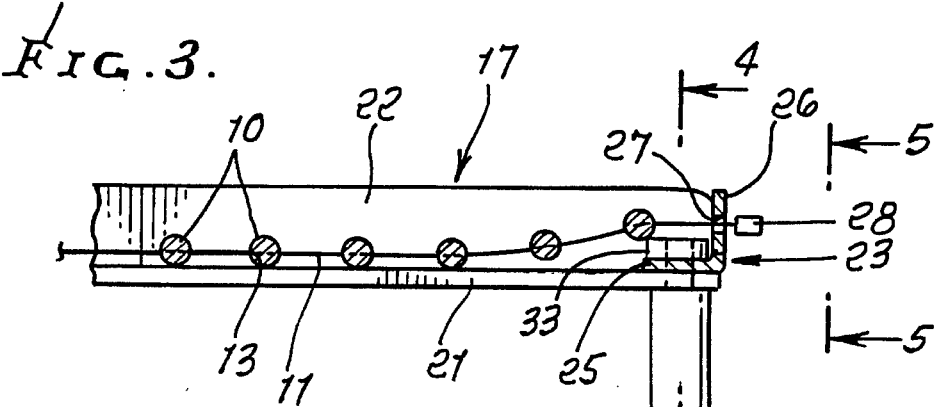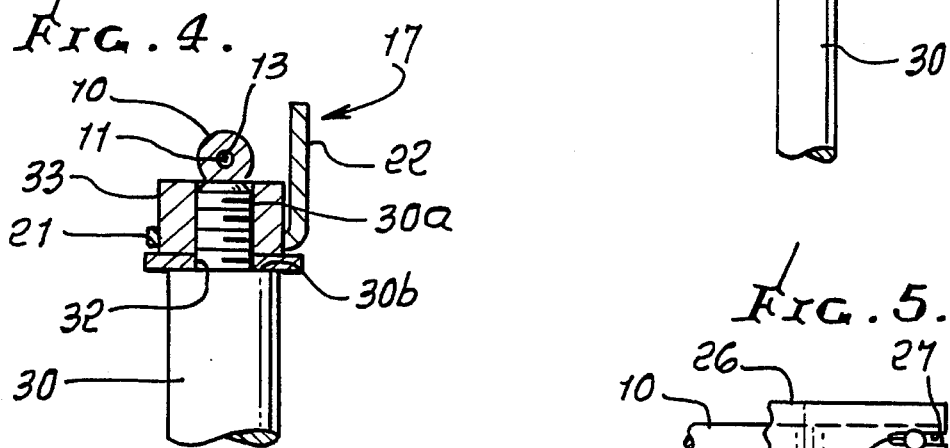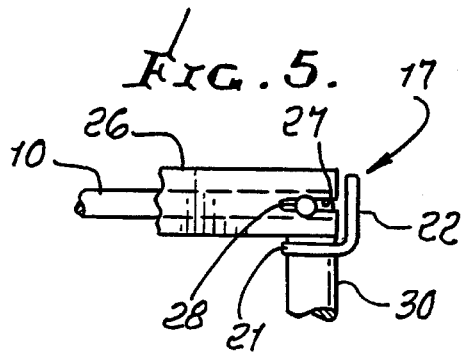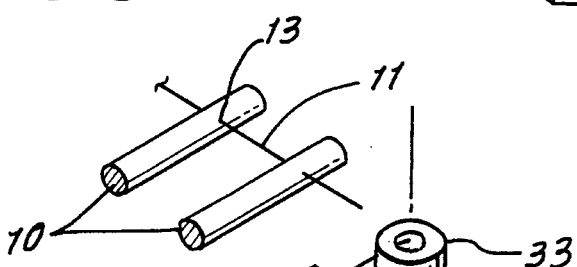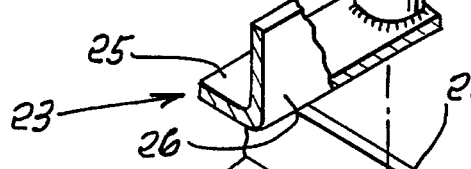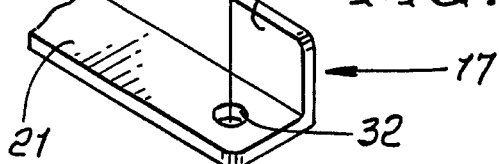

ROLL-UP BARBECUE APPARATUS

BACKGROUND OF THE INVENTION

This invention relates generally to barbecue apparatus, and more particularly to easily transported apparatus adapted for rapid set up and use, as during camping and at other times. More particularly, it concerns barbecue apparatus having a grill, which may be easily rolled up for transport, and ultimately unrolled to form a cooking grill.

There is great need for easily transported, lightweight, and easily set up barbecue apparatus, as for use by campers who may hike considerable distances before setting up camp. In the past, bulky and heavy barbecue apparatus was necessarily transported by campers, adding considerably to pack weight, and also being otherwise objectionable. Accordingly, there is great need for improved barbecue apparatus, as referred to above.

SUMMARY OF THE INVENTION

It is a major object of the invention to provide greatly improved barbecue apparatus, which is easily transported, lightweight, and which is not bulky, to fit the above need. Basically, the apparatus comprises:

a) a series of longitudinally extending, laterally spaced grill rods, b) and laterally extending, longitudinally spaced cables connected to the rods, c) the cables being flexible, whereby the rods and cables may be rolled up into a bundle for transport, and unrolled to form a cooking grill.

It is another object of the invention to provide frame structure, which may be assembled, as at a camp site, to support the grill rods after they have been unrolled, as from a bundle, and proximate opposite ends of the rods. One reason this is possible is because the rods are interconnected by the flexible cables or wires to position their ends in two rows, which are spaced apart, as will be seen.

It is another object of the invention to provide frame structure for shielding the cables or wires from direct contact with flames rising between the grill rods. In this regard, the frame structure typically includes elements that have L-shape cross sections in upright planes, to provide horizontal flanges extending beneath the rod ends and upright elongated flanges proximate to the rod ends, and between which the rods are confined.

A further object includes the provision of such frame structure, which also includes other elements extending longitudinally, to form with said certain elements rectangular shape, peripherally bounding the grill rods. As will be seen, certain frame structure elements have removable connection to others of the elements, whereby the frame structure elements may easily be assembled into a rectangle shape to support the unrolled grill rods positioned by their wires or cables; and the frame structure elements may easily be disassembled and arranged adjacent and parallel to the rolled up rod bundle for ready transport. Such elements may consist of lightweight metal, such as aluminum or other lightweight material.

Yet another object is to provide upright supports, such as legs, removably connected or connectible to corner portions of the elongated frame elements or members arranged in rectangular form; and typically to interconnect them at such corners as a result of assembly to the upright leg members, as will be seen. Such legs may also be assembled in parallel relation and to the grill rod bundle in rolled up condition, for ready transport.

These and other objects and advantages of the invention, as well as the details of an illustrative embodiment, will be more fully understood from the following specification and drawings, in which:

DRAWING DESCRIPTION

FIG. 1 is a perspective view showing the assembled barbecue apparatus;

FIG. 2 is an enlarged plan view of a corner portion of the FIG. 1 apparatus showing relationships of elements when assembled;

FIG. 3 is a vertical section taken on lines 3—3 of FIG. 2;

FIG. 4 is an elevation taken in section on lines 4—4 of FIG. 3;

FIG. 5 is an elevation taken on lines 5—5 of FIG. 3;

FIG. 6 is an exploded perspective of elements forming a corner portion of the apparatus;

DETAILED DESCRIPTION

Figure 7:
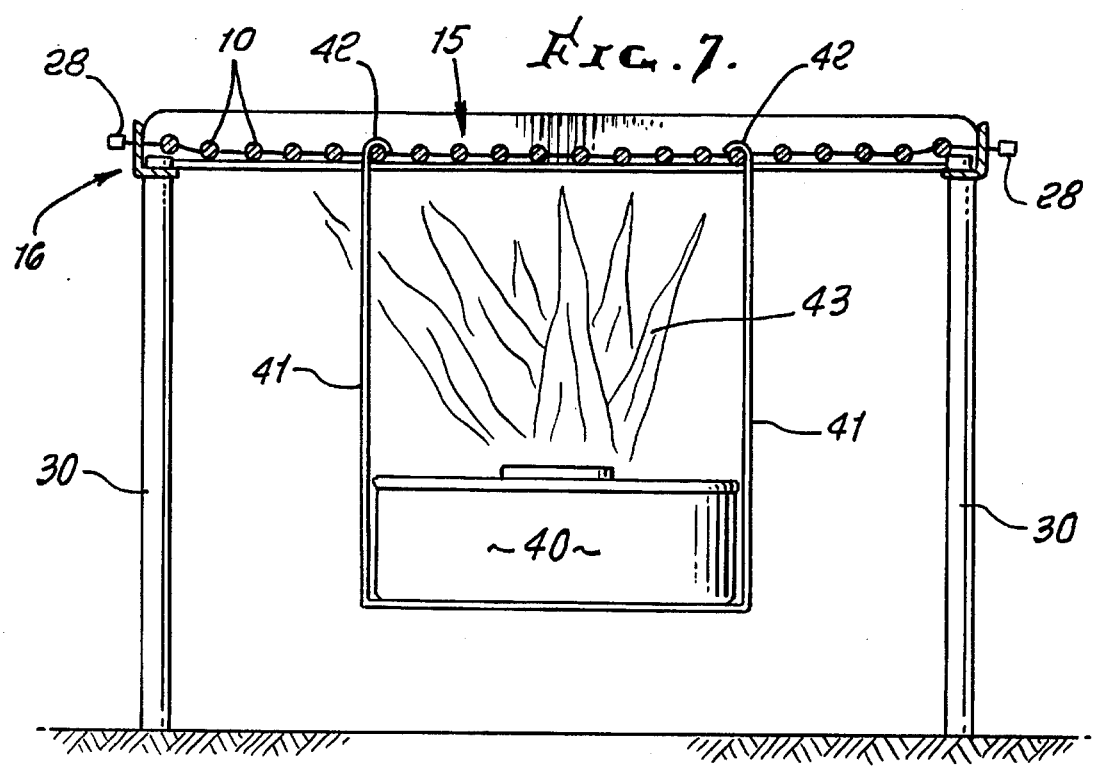
FIG. 7 is a elevation showing the apparatus assembled, with heating means suspended from the unrolled grill rods.
Figure 8:
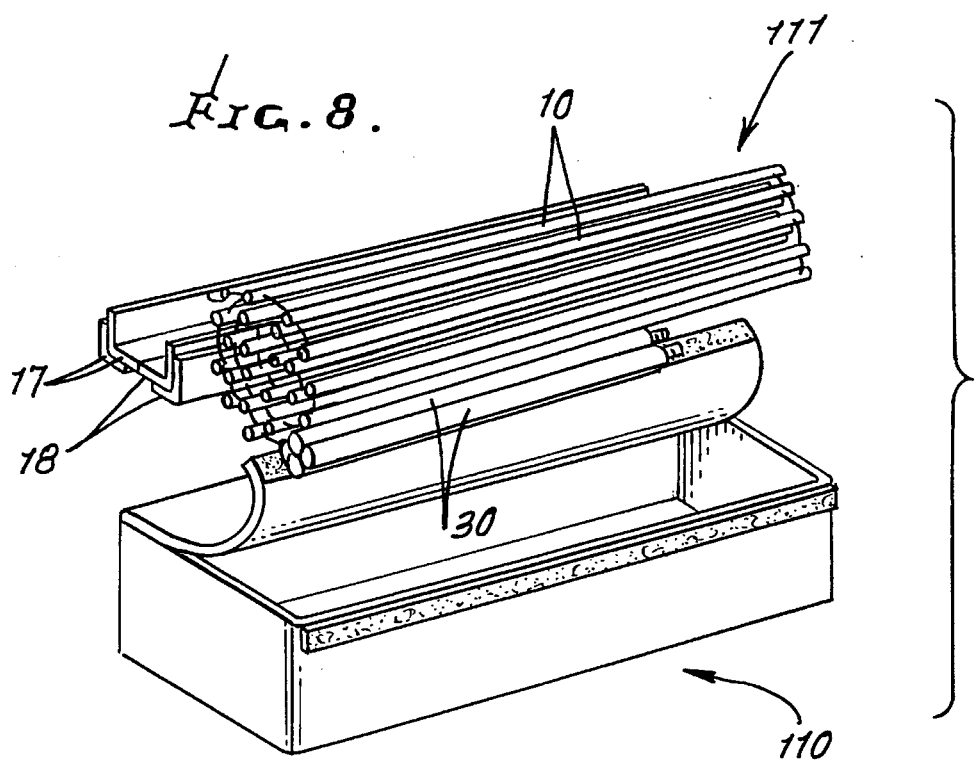
FIG. 8 shows the rolled up rods in a bundle, together with frame elements and leg elements adjacent to the bundle, to be transported in a container.

In FIGS. 1–7, a series of longitudinally extending, laterally spaced grill rods 10 have been unrolled from bundle shape, as seen in FIG. 8 at 111. Such rods may consist of metal, such as steel, and the grill, thereby formed by the unrolled rods may have any desired shape, normally rectangular. Laterally extending, longitudinally spaced cables or wires 11 and 12 are connected to the rods, typically proximate opposite ends thereof, as shown.

For this purpose, and as shown in FIG. 3, the rods 10 may have openings 13 drilled through them and of substantially the same diameter as the wire or cable 11 or 12; the wire or cable may be passed through such openings and the rods spaced apart as shown; also, the rods may be crimped to grip the cables or wires. The cables or wires are typically flexible in the spaces between the rods, allowing the spaced, parallel rods to be rolled up in a bundle 111.

Accordingly, the rods and cables may be rolled up into bundle form, for transport as in a container 110 seen in FIG. 8; and the rods and cables may be ultimately unrolled to form the cooking grill indicated at 15 in FIG. 1, and also in FIGS. 2, 3, and 7. In that condition, the unrolled rods and wires form a generally rectangular grill, which may be supported by structure, as will be referred to below; or may also be supported by bricks, stones, or other means at a camp site.

As illustrated in FIG. 1, frame structure 16 is provided to support the rods 10 proximate opposite ends thereof. Such frame structure includes certain elements, such as frame elements 17 and 18, which extend laterally in parallel relation, typically beneath the rod ends and beneath two of the cables, as indicated at 11 and 12, for shielding those cables from direct contact with the flames rising between the grill rods. Accordingly, the elements 17 and 18 have the functions of supporting the rods at their ends, and also shielding the cables. In this regard, other cables may be located intermediate and along the grill rods to provide added support.

Elements 17 and 18 typically have L-shaped cross sections in upright planes normal to their length. As shown, such cross sections are provided by horizontal flanges 21 (see FIG. 6) that extend beneath the rod ends, and also beneath the cables, and upright flanges 22 that extend proximate and in facing relation to the rod ends, whereby the rods 10 are confined longitudinally between the flanges 22 of the frame elements 17 and 18. The confinement is such that the wires 11 and 12 always remain beneath the flanges 21.

The frame structure also includes other elements 23 and 24 that extend longitudinally, to connect with elements 17 and 18, to form an assembled rectangular frame peripherally bounding the grill rods. Elements 23 and 24 may also have L-shaped cross sections, as is clear from FIGS. 3 and 6, with horizontal flanges 25 and upright flanges 26, the former supported by flanges as seen in FIG. 3 upon assembly. Note that flanges 26 may contain through openings 27 to pass the cables 11 and 12, there being retainers 28 integral with the ends of the cables, and at the outer sides of the flanges 26, the retainers 28 preventing complete withdrawal of the cables through the openings. Therefore, the elements 23 and remain loosely assembled to the cables and to the rods, to be rolled up into the bundle 111, as seen in FIG. 8.

Also provided are upright support members, such as four legs 30, as in the form of rods, and which may be employed to interconnect with the frame structure at its corners, to support the grill 15, as see in FIG. 1, at a camp site, and above the flames 33 rising from the coals 34. Such rods may have structure at their upper ends configured to rapidly connect to the frame structure elements to assemble them in rectangular condition. As shown in FIG. 6, reduced diameter threaded portions 30*a* of the rods 30 at their upper ends are sized for reception through openings 32 in the flanges 21, and for threaded tightening into nuts 33, or equivalent means integral with flanges 25, as seen in FIG. 6, to be tightened in the nuts (by leg rotation), causing flanges 25 to clamp down on flanges 21, the latter in turn clamping down to the rod shoulders 30*b*, thereby to form an integrated assembly at each corner of the frame structure. This also allows rapid disassembly of the rods from the frame structure at the camp site and bundling of the rods into the grill rod bundle 111, for transport.

FIG. 7 shows an alternative arrangement whereby a container 40 for hydrocarbon fuel may be suspended by hangers 41, hooking at 42 over certain of the rods 10 The container 40, therefore, is positioned directly beneath the grill, whereby flames 43 rising from the fuel may contact food, such as meat, on the grill at a camp site.

I claim:

1. In portable barbecue apparatus, the combination comprising:

a) a series of longitudinally extending, laterally spaced grill rods, b) and laterally extending, longitudinally spaced cables connected to the rods, c) the cables being flexible, whereby the rods and cables may be rolled up into a bundle for transport, and unrolled to form a cooking grill, d) there being frame structure supporting the rods proximate opposite ends thereof, the frame structure including certain elements extending laterally beneath said rod ends and beneath at least two of the cables, for shielding the cables from direct contact with flames rising between the grill rods, e) the frame structure including other elements extending longitudinally to form with said certain elements a rectangular shape, peripherally bounding said grill rods, said other elements having upright flanges extending parallel to said rods, f) and wherein said other element upright flanges have through openings passing end portions of the cables, and including retainers on the cable ends to retain the cables extending between said other element upright flanges.

2. The combination of claim 1 wherein said frame structure certain elements have L-shaped cross sections in upright planes, to provide horizontal flanges extending beneath the rod ends and upright flanges proximate the rod ends, and between which rods are confined.

3. The combination of claim 3 wherein said certain elements have removable connection to said other elements.

4. The combination of claim 3 including upright support rods removably connected to said certain and other elements.

5. The combination of claim 1 wherein said certain and other elements consist of lightweight metal.

6. The combination of claim 1 including legs removably attached to said elements and extending downwardly therefrom.

7. The combination of claim 6 wherein said legs have threaded projections and said elements have openings upwardly receiving said projections.

* * * * *